(12) United States Patent
Park

(10) Patent No.: US 12,301,363 B2
(45) Date of Patent: *May 13, 2025

(54) METHOD AND APPARATUS FOR TRANSMITTING AND RECEIVING SIDELINK HARQ FEEDBACK INFORMATION

(71) Applicant: KT CORPORATION, Seongnam-si (KR)

(72) Inventor: Kyujin Park, Seongnam-si (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,260

(22) Filed: Jun. 17, 2023

(65) Prior Publication Data

US 2023/0336279 A1    Oct. 19, 2023

Related U.S. Application Data

(63) Continuation of application No. 16/829,242, filed on Mar. 25, 2020, now Pat. No. 11,722,255.

(30) Foreign Application Priority Data

Mar. 26, 2019  (KR) .................. 10-2019-0034226
Feb. 19, 2020  (KR) .................. 10-2020-0020091

(51) Int. Cl.
*H04L 1/1812*  (2023.01)
*H04W 72/21*  (2023.01)
*H04W 72/23*  (2023.01)

(52) U.S. Cl.
CPC .......... *H04L 1/1812* (2013.01); *H04W 72/21* (2023.01); *H04W 72/23* (2023.01)

(58) Field of Classification Search
CPC ... H04L 1/1812; H04L 5/0057; H04L 1/1854; H04L 5/0055; H04L 1/1887;
(Continued)

(56) References Cited

U.S. PATENT DOCUMENTS 11,722,255 B2 *   8/2023  Park .................. H04L 1/1812
                                                         370/329
2019/0174530 A1 *  6/2019  Kim .................... H04W 72/12
(Continued)

*Primary Examiner* — Hanh N Nguyen
(74) *Attorney, Agent, or Firm* — INVENSTONE Patent, LLC

(57) ABSTRACT

Provided are methods and apparatuses for transmitting HARQ feedback information for sidelink transmission. In particular, a method of a transmitter user equipment (Tx UE) is provided for transmitting the HARQ feedback information for the sidelink transmission. The method may include: receiving, from the base station, resource allocation information on a physical uplink control channel (PUCCH) for transmitting, to the base station, the HARQ feedback information for the sidelink transmission to a receiver user equipment (Rx UE); generating the HARQ feedback information based on a physical sidelink feedback channel (PSFCH) for the sidelink transmission received from the Rx UE; and transmitting the HARQ feedback information over the PUCCH based on the resource allocation information to the base station.

18 Claims, 20 Drawing Sheets

(58) Field of Classification Search
CPC ... H04L 1/1829; H04L 5/0094; H04L 1/1864; H04L 1/887; H04W 72/21; H04W 72/23; H04W 4/40; H04W 4/46
See application file for complete search history.

(56) References Cited

U.S. PATENT DOCUMENTS

| | | |
|---|---|---|
| 2020/0220669 A1 | 7/2020 | Park |
| 2020/0267597 A1 | 8/2020 | Huang et al. |
| 2020/0275474 A1 | 8/2020 | Chen |
| 2020/0304969 A1 | 9/2020 | Basu Mallick et al. |
| 2021/0250136 A1 | 8/2021 | Ye et al. |
| 2021/0288778 A1* | 9/2021 | Park .................. H04L 1/1858 |
| 2021/0321380 A1* | 10/2021 | Zhao .................. H04L 1/1896 |
| 2021/0400681 A1* | 12/2021 | Wang .................. H04L 5/0053 |
| 2021/0409166 A1* | 12/2021 | Wang .................. H04L 1/1861 |
| 2022/0077962 A1 | 3/2022 | Zhao |
| 2022/0140958 A1* | 5/2022 | Zhou .................. H04L 1/1887 370/329 |
| 2022/0159649 A1 | 5/2022 | Ko et al. |

* cited by examiner

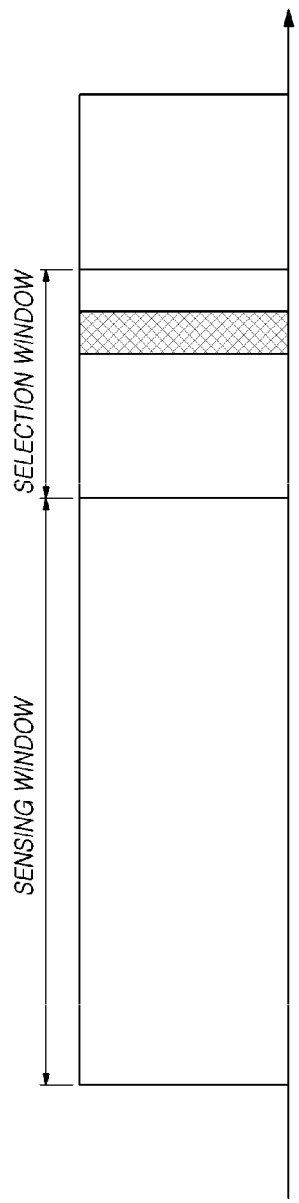

*FIG.16*

DCI format

| ... | HARQ feedback Timing indicator | ... | PUCCH resource indicator | ... | PSSCH scheduling information | ... |

METHOD AND APPARATUS FOR TRANSMITTING AND RECEIVING SIDELINK HARQ FEEDBACK INFORMATION

CROSS-REFERENCE TO RELATED APPLICATION

This application is a continuation application of U.S. Patent Application No. 16/829,242, filed on Mar. 25, 2020, which claims the priority benefit of Korean Patent Application No. 10-2019-0034226, filed on Mar. 26, 2019 and No. 10-2020-0020091, filed on Feb. 19, 2020 in the Korean Intellectual Property Office, the disclosures of which are incorporated herein by reference in their entirety.

BACKGROUND

1. Technical Field

The present disclosure relates to methods and apparatuses for transmitting and receiving sidelink HARQ feedback information in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

To address such issues, a design is needed for transmitting HARQ ACK/NACK feedback information to a base station for device-to-device radio link transmission for providing a V2X service in the NR, that is, NR sidelink transmission.

SUMMARY

In accordance with embodiments of the present disclosure, methods and apparatuses are provided for assigning a radio resource for transmitting HARQ feedback information for sidelink transmission to a base station, in the NR.

In accordance with one aspect of the present disclosure, a method of a transmitter user equipment is provided for transmitting HARQ feedback information for sidelink transmission to a base station. The method may include: receiving, from the base station, resource allocation information on a physical uplink control channel (PUCCH) for transmitting, to the base station, the HARQ feedback information for the sidelink transmission to a receiver user equipment; generating the HARQ feedback information based on a physical sidelink feedback channel (PSFCH) for the sidelink transmission received from the receiver user equipment; and transmitting the HARQ feedback information over the PUCCH based on the resource allocation information to the base station.

In accordance with another aspect of the present disclosure, a method of a base station is provided for receiving HARQ feedback information for sidelink transmission from a transmitter user equipment. The method may include: transmitting, to the transmitter user equipment, resource allocation information on a physical uplink control channel (PUCCH) for transmitting, to the base station, the HARQ feedback information for the sidelink transmission to a receiver user equipment; and receiving, over the PUCCH, the HARQ feedback information generated in the transmitter user equipment based on a physical sidelink feedback channel (PSFCH) transmitted from the receiver user equipment.

In accordance with further another aspect of the present disclosure, a transmitter user equipment is provided for transmitting HARQ feedback information for sidelink transmission to a base station. The transmitter user equipment may include: a receiver receiving, from the base station, resource allocation information on a physical uplink control channel (PUCCH) for transmitting, to the base station, the HARQ feedback information for the sidelink transmission to a receiver user equipment; a controller generating the HARQ feedback information based on a physical sidelink feedback channel (PSFCH) for the sidelink transmission received from the receiver user equipment; and a transmitter transmitting the HARQ feedback information over the PUCCH based on the resource allocation information to the base station.

In accordance with yet another aspect of the present disclosure, a base station is provided for receiving HARQ feedback information for sidelink transmission from a transmitter user equipment. The base station may include: a transmitter transmitting, to the transmitter user equipment, resource allocation information on a physical uplink control channel (PUCCH) for transmitting, to the base station, the HARQ feedback information for the sidelink transmission to a receiver user equipment; and a receiver receiving, over the PUCCH, the HARQ feedback information generated in the transmitter user equipment based on a physical sidelink feedback channel (PSFCH) transmitted from the receiver user equipment.

In accordance with embodiments of the present disclosure, it is possible to provide methods and apparatuses for transmitting and receiving sidelink feedback information for assigning a radio resource for transmitting HARQ feedback information for sidelink transmission to a base station, in the NR.

BRIEF DESCRIPTION OF THE DRAWINGS

The above and other aspects, features, and advantages of the present disclosure will be more apparent from the following detailed description taken in conjunction with the accompanying drawings, in which:

FIGS. 11A and 11B illustrate a type of a V2X transmission resource pool;

FIG. 16 illustrates a DCI format including resource allocation information on a PUCCH in accordance with embodiments of the present disclosure;

DETAILED DESCRIPTION

Figure 1:
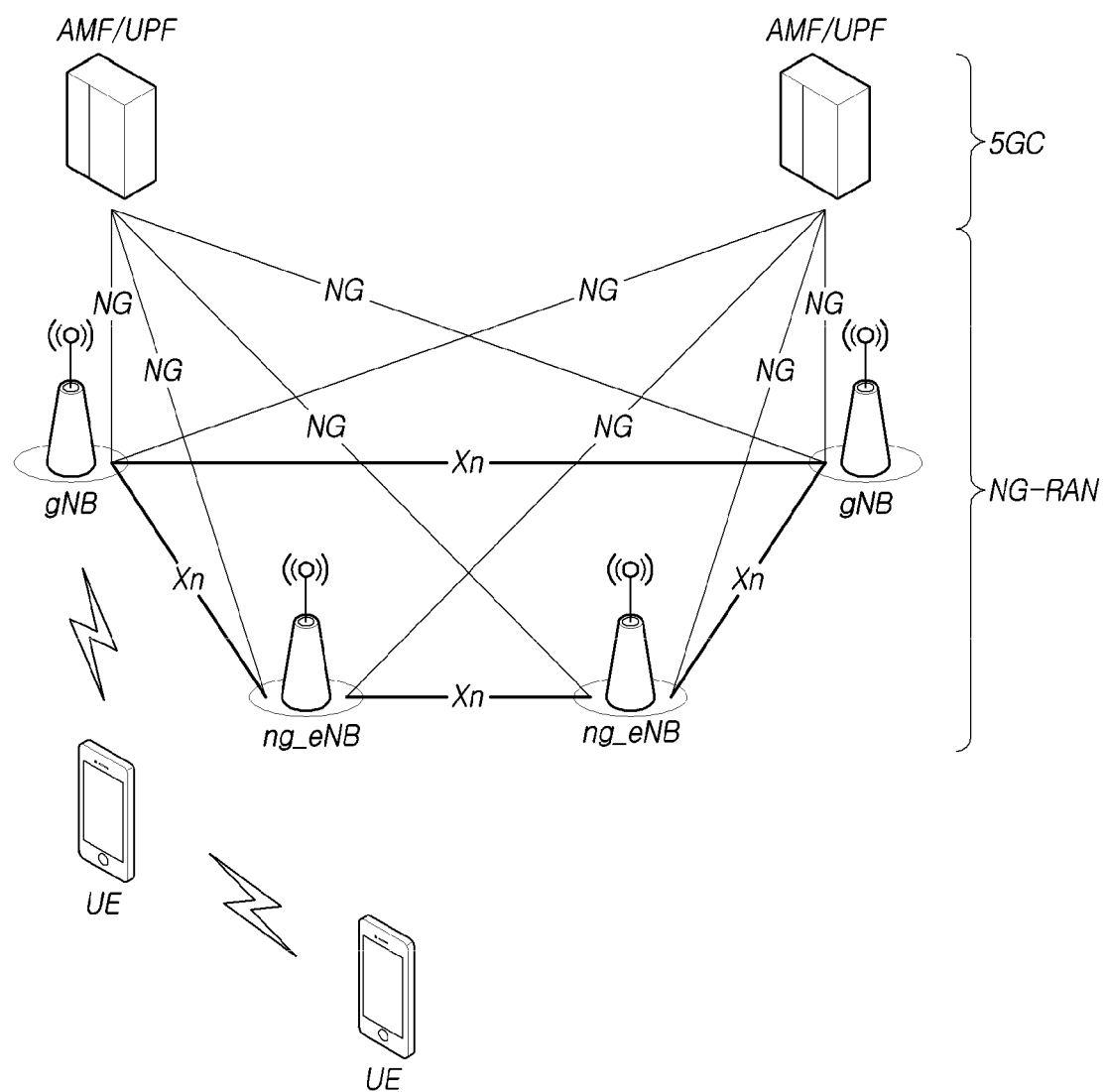
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3rd generation partnership project (3GPP), 3GPP2, WiFi, Bluetooth, institute of electrical and electronics engineers (IEEE), international telecommunication union (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Furthermore, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF)

controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT-s)-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
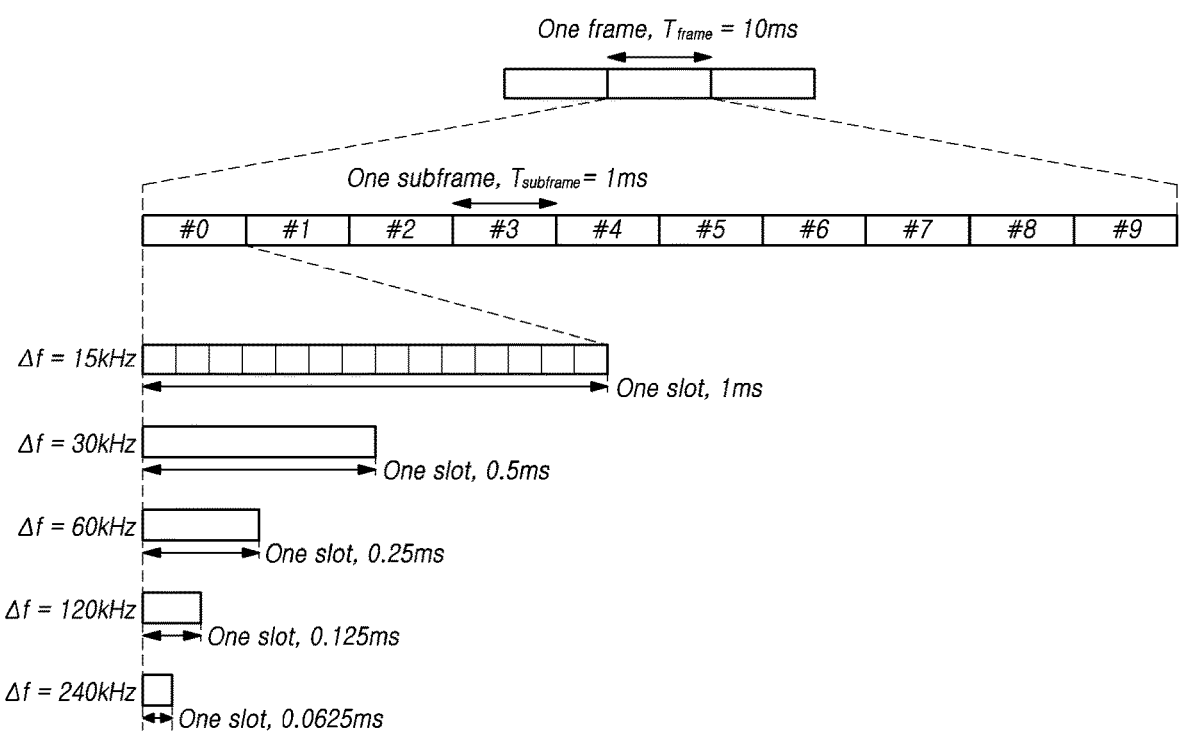
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and has a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource assignment as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically inform the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
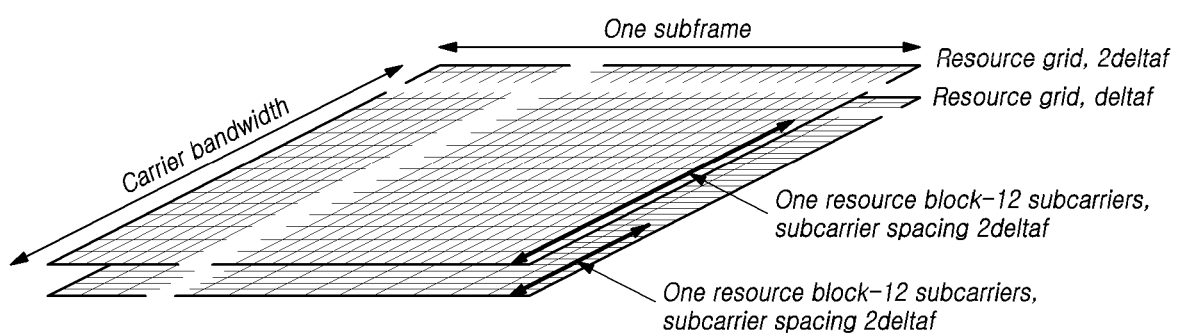
FIG. 3 illustrates resource grids supported by a radio access technology in accordance with embodiments of the present disclosure.

FIG. 3 illustrates resource grids supported by a radio access technology in accordance with embodiments of the present disclosure;

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
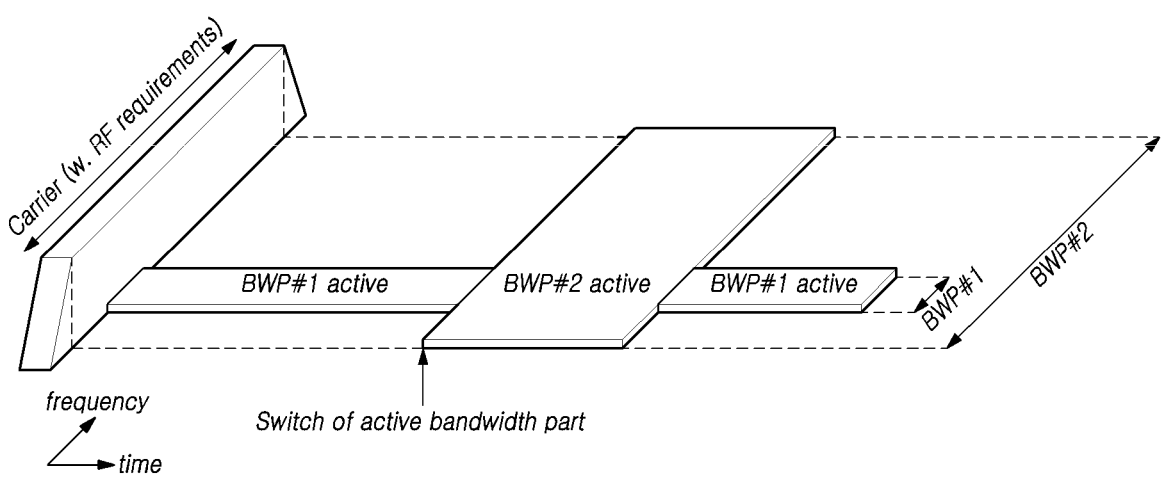
FIG. 4 illustrates bandwidth parts supported by a radio access technology in accordance with embodiments of the present disclosure.

FIG. 4 illustrates bandwidth parts supported by a radio access technology in accordance with embodiments of the present disclosure;

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
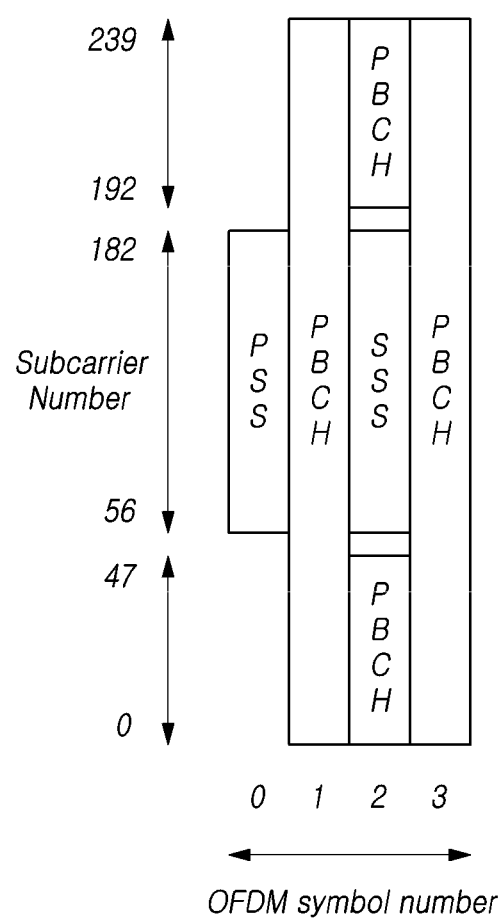
FIG. 5 illustrates an example of a synchronization signal block in a radio access technology in accordance with embodiments of the present disclosure.

FIG. 5 illustrates an example of a synchronization signal block in a radio access technology in accordance with embodiments of the present disclosure;

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB 1 may be periodically transmitted, or the remaining SIB s may be transmitted according to the request of the UE.

Figure 6:
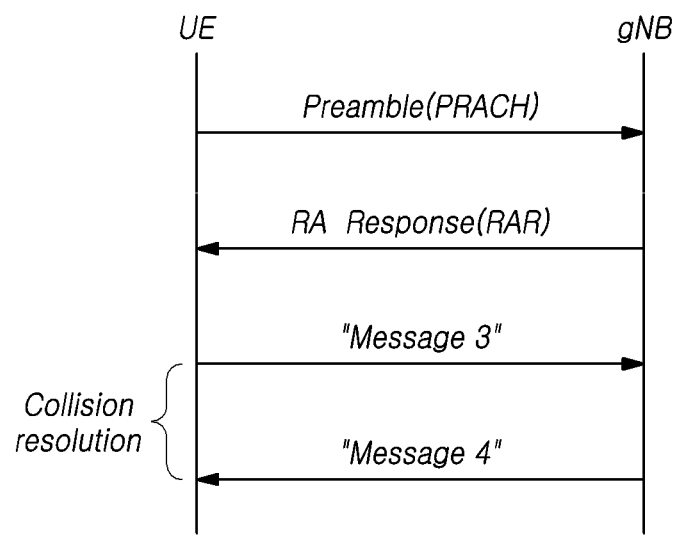
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
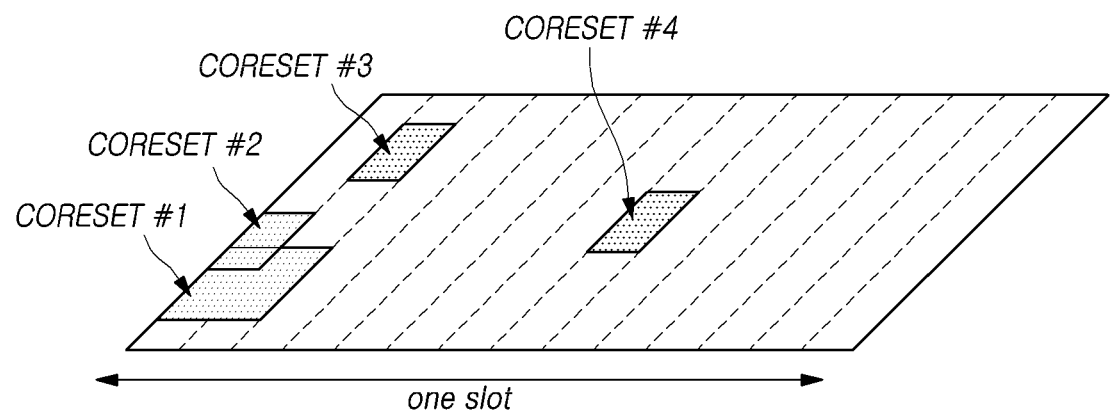
FIG. 7 illustrates CORESET.

FIG. 7 illustrates CORESET;

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have introduced 27 service scenarios related to vehicle recognition/detection in Rel-14, and determined key performance requirements according to road conditions. In addition, the 3GPP have introduced 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Assignment>

Figure 8:
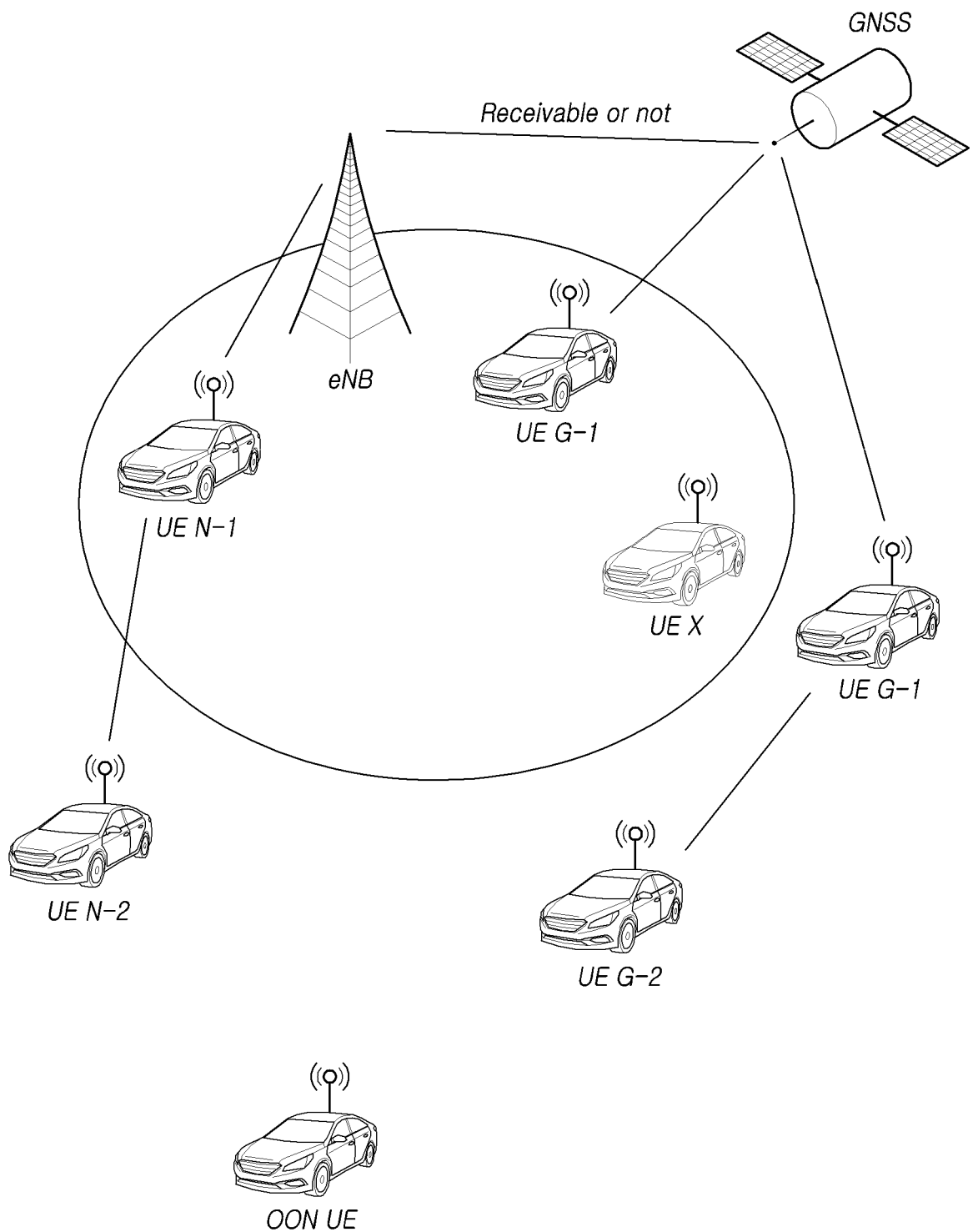
FIG. 8 illustrates various scenarios for V2X communication.

FIG. 8 illustrates various scenarios for V2X communication;

Referring to FIG. 8, a V2X device (represents a vehicle; however, may be replaced with other devices, such as a user equipment (UE), etc.) may be located in coverage of a base station (e.g., an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a Tx UETx UE.

Figure 9A:
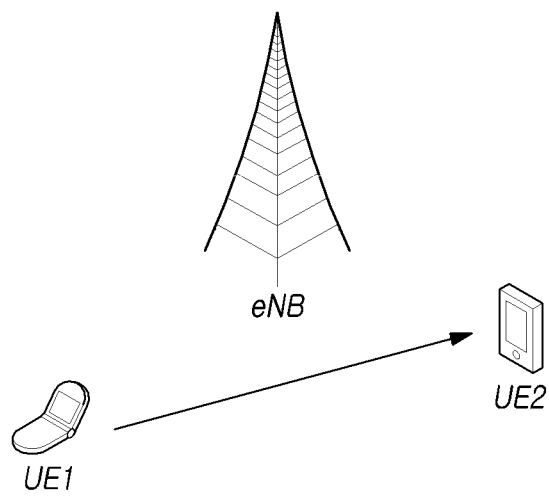
FIG. 9A illustrates a first user equipment (UE1) and a second user equipment (UE2) performing sidelink communication.
Figure 9B:
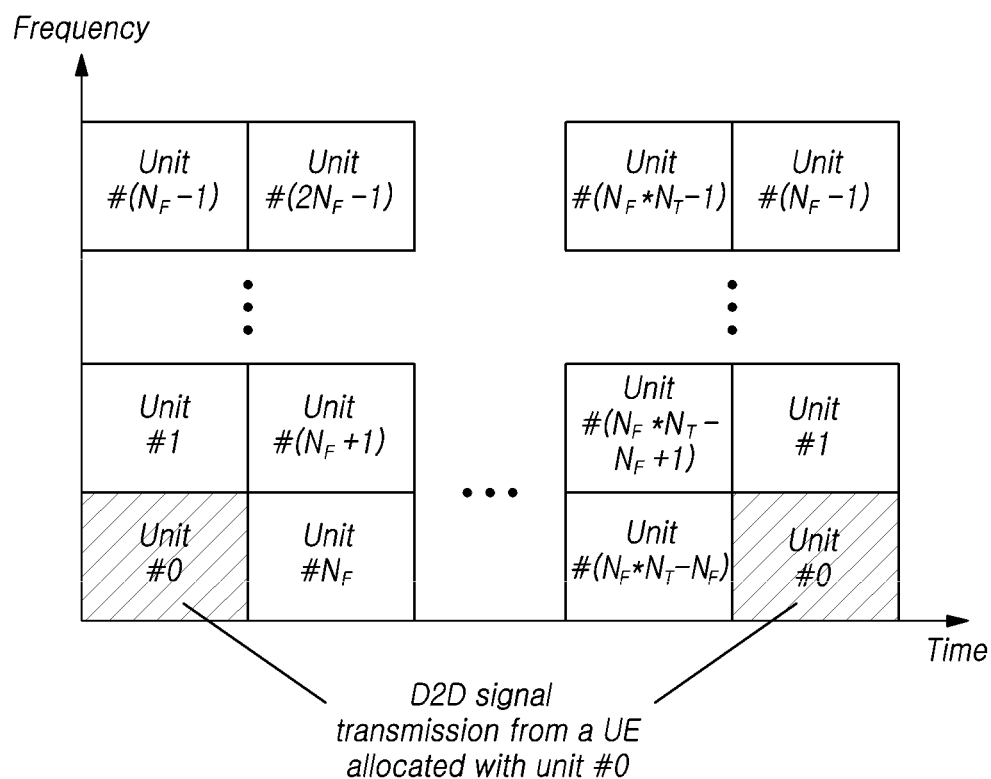
FIG. 9B illustrates an example of resource pools for user equipments.

FIG. 9A illustrates a first user equipment (UE1) and a second user equipment (UE2) performing sidelink communication, and FIG. 9B illustrates an example of resource pools used by the UEs.

Referring to FIG. 9, an eNB represents a base station; however, the embodiments are not limited thereto. For example, the base station may be a gNB or an ng-eNB. Further, the UEs represent mobile terminals; however, the embodiments are not limited thereto. For example, the UEs may represent vehicles, infrastructures, or the like depending on scenarios or situations.

In FIG. 9A, the Tx UE (UE 1) may select a resource unit corresponding to a specific resource within a resource pool including a set of resources and transmit a sidelink signal using the resource unit. The Rx UE (UE 2) may be configured with a resource pool over which the UE 1 is allowed to transmit a signal and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units may be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a Tx UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may cause a time delay until a data resource is assigned after a SA resource has been assigned to be reduced. For example, it is possible to consider a non-adjacent scheme in which a control channel resource and a data channel resource are split in time domain in one subframe, an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a Tx UE to transmit information, such as an ID of the Tx UE, or the like, and a neighboring UE to discover the Tx UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a Tx UE or whether a Tx UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for performing communication using the sidelink. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (e.g., the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink >

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
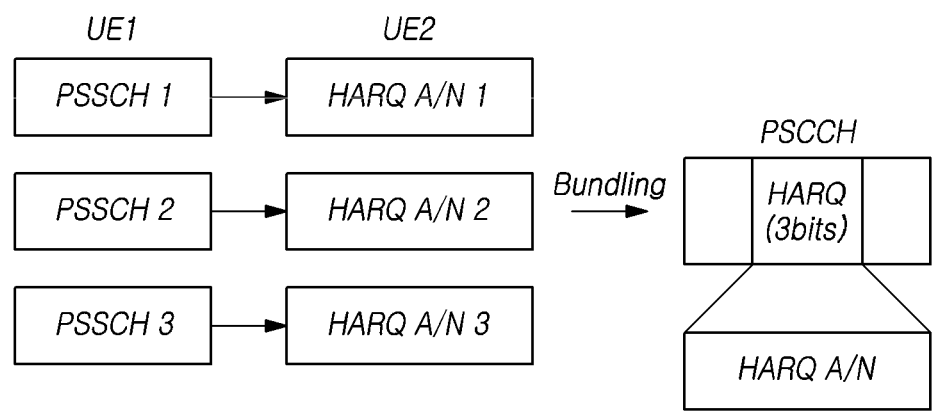
FIG. 10 illustrates a method of bundling and transmitting HARQ feedback information in the V2X.

FIG. 10 illustrates a method of bundling and transmitting HARQ feedback information in the V2X;

Referring to FIG. 10, in the LTE V2X, separate HARQ ACK/NACK information is not transmitted in order to reduce system overhead, and data are allowed to be retransmitted once according to discretion of a Tx UE for data transmission safety. However, in the NR V2X, in terms of data transmission stability, HARQ ACK/NACK information may be transmitted. In this case, overhead may be reduced by bundling and transmitting the corresponding information.

That is, when a Tx UE (UE1) transmits three data transmissions to a Rx UE (UE2), and then the Rx UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

The following four options have been discussed for multiplexing of a PSCCH and an associated PSSCH, as illustrated in FIG. 11. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource assignment modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
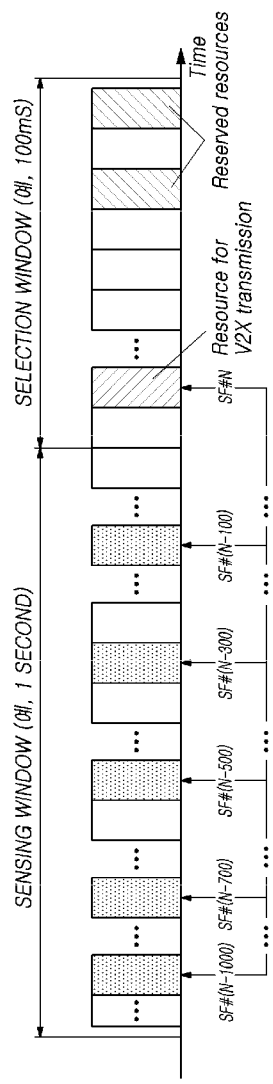

FIGS. 11A and 11B illustrate a type of a V2X transmission resource pool;

Referring to FIG. 11A, V2X transmission resource pool #A may be a resource pool over that allows partial sensing only. A V2X transmission resource selected by the partial sensing is remained semi-statically at a regular interval.

Referring to FIG. 11B, V2X transmission resource pool #A may be a resource pool allowing a random selection only. In V2X transmit resource pool #B, a UE does not perform partial sensing, and the UE may randomly select a V2X transmission resource in a selection window.

For example, unlike a resource pool over allowing partial sensing only, in a resource pool over allowing the random selection only, a selected resource may be configured/signaled not to be semi-statically reserved. In order for a UE to perform a V2X message transmission operation over a V2X transmission resource pool, a base station may cause the UE not to perform a sensing operation (based on scheduling assignment decoding/energy measurement).

Although not illustrated in FIGS. 11A and 11B, a resource pool allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined. Thus the scheduling for the latency critical data, such as the URLLC, may be performed based on the mini-slot.

Figure 12:
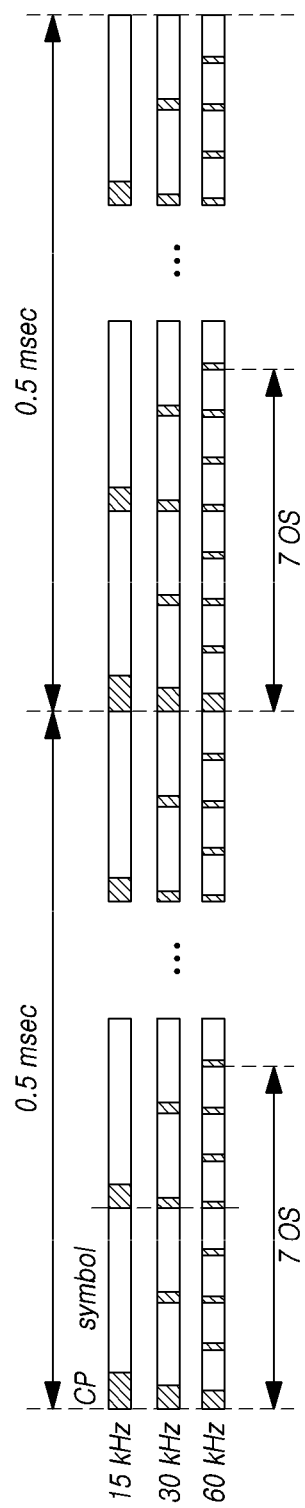
FIG. 12 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
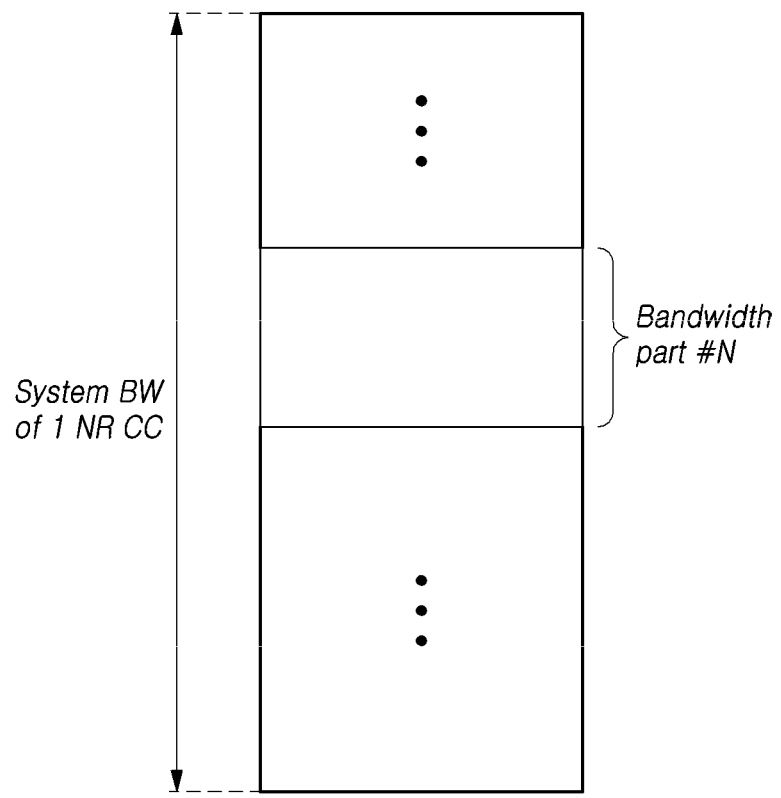
FIG. 13 schematically illustrates a bandwidth part in accordance with embodiments of the present disclosure.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

LTE Sidelink

In the LTE system, for providing device-to-device direct communication and a vehicle-to-everything (V2X) (in particular, vehicle-to-vehicle (V2V)) service, designs have been developed for a radio channel and a radio protocol for transmission/reception of the sidelink which is direct link between UEs. With respect to the sidelink, the PSSS/SSSS and a physical sidelink broadcasting channel (PSBCH) are defined. The PSSS/SSS is a signal for synchronizing between a radio sidelink transmission end and a radio sidelink reception end. The physical sidelink broadcasting channel (PSBCH) is a broadcasting channel for transmitting/receiving a sidelink master information block (MIB) related to this. Further, many studies have been conducted to develop a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

A method of assigning a HARQ ACK/NACK feedback resource

According to a PUCCH resource assignment method for HARQ ACK/NACK feedback of a UE, which is defined in the NR, a base station configures a PUCCH resource set including one or more PUCCH resources for a UE and indicates (e.g., inform) PUCCH resource information to be used for HARQ ACK/NACK feedback in response to a PDSCH transmission using an ACK resource indicator (ARI) information area of the DCI. In this case, the PUCCH resource set is configured for each UL BWP configured for a corresponding UE, and separate PUCCH resource set(s) may be configured depending on a payload size of HARQ ACK/NACK for a UL BWP.

Hereinafter, a method of transmitting sidelink HARQ feedback information is specifically described with reference to drawings.

Herein, the term "receiver UE (Rx UE)" means a UE receiving a PSCCH and a PSSCH corresponding to the PSCCH based on sidelink communication. The term "transmitter UE (Tx UE)" herein means a UE transmitting a PSCCH and a PSSCH corresponding to the PSCCH based on sidelink communication.

Embodiments herein will be basically described based on a scenario in which a Rx UE transmits HARQ ACK/NACK feedback information based on the sidelink to a Tx UE. However, embodiments of the present disclosure may be substantially equally applied to a scenario in which a Rx UE transmits HARQ ACK/NACK feedback information to a base station without departing from the spirit and the scope of the present disclosure.

Figure 14:
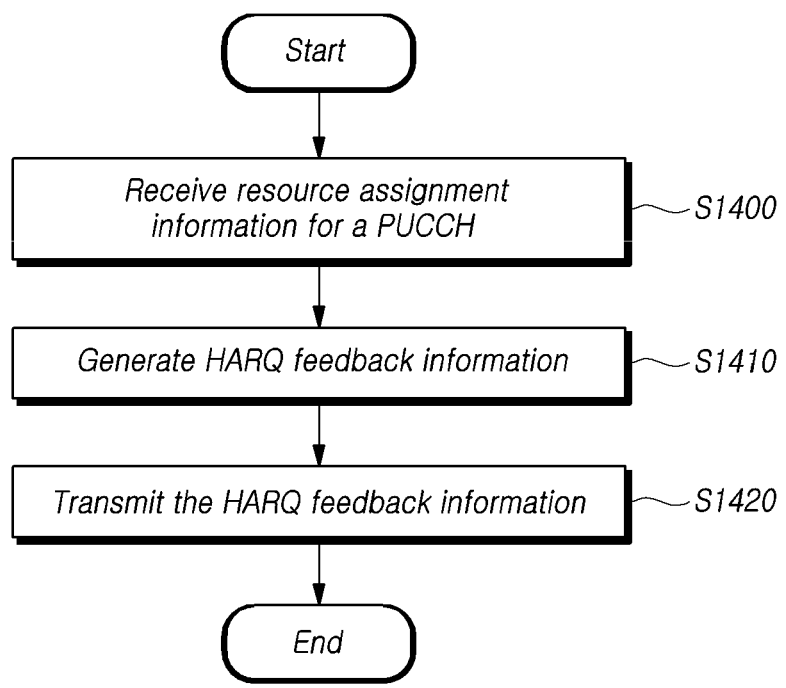
FIG. 14 is a flow diagram illustrating a procedure of a transmitter user equipment for transmitting HARQ feedback information for sidelink transmission to a base station in accordance with embodiments of the present disclosure.

FIG. 14 is a flow diagram illustrating a procedure of a transmitter user equipment for transmitting HARQ feedback information for sidelink transmission to a base station in accordance with embodiments of the present disclosure.

Referring to FIG. 14, a Tx UE may receive, from a base station, resource allocation information on a physical uplink control channel (PUCCH) for transmitting, to the base station, HARQ feedback information for sidelink transmission to a Rx UE, at step S1400.

In the case of mode 1 in which the base station performs scheduling for sidelink transmission, the Tx UE may receive resource allocation information on a PSSCH through a DCI format (hereinafter, referred to as "sidelink assignment DCI format") from the base station. When the Tx UE transmits the PSSCH, or the like through a sidelink according to the corresponding resource allocation information, the Rx UE may transmit HARQ ACK/NACK feedback information corresponding to the received PSSCH over a physical sidelink feedback channel (PSFCH) to the Tx UE. According to this, the Tx UE may transmit the HARQ ACK/NACK feedback information for a PSSCH retransmission indication over the PUCCH to the base station according to the received HARQ ACK/NACK feedback information received from the Rx UE.

Accordingly, in one embodiment, the base station may include a PUCCH resource indicator information region for a sidelink retransmission indication of the corresponding Tx UE in the sidelink assignment DCI format. That is, as shown in FIG. 16, one or more PUCCH resource indicator information regions may be further included in the sidelink assignment DCI format, as resource allocation information on a PUCCH for the sidelink retransmission indication along with scheduling information on a PSSCH.

Referring back to FIG. 14, the Tx UE may generate HARQ feedback information based on the PSFCH for the sidelink transmission received from the Rx UE, at step S1410.

The Tx UE may perform a PSSCH transmission over a sidelink radio resource assigned by the base station based on the sidelink assignment DCI format. Thereafter, the Tx UE may explicitly or implicitly receive HARQ ACK/NACK feedback information over the PSFCH from the Rx UE.

The Tx UE may transmit, in the form of HARQ ACK/NACK, information on whether retransmission is needed for the corresponding PSSCH to the base station over the assigned PUCCH resource, based on the HARQ ACK/NACK feedback information of the Rx UE for the PSSCH transmission. In this case, the HARQ feedback information transmitted to the base station may be generated to have an equal value to HARQ feedback information for the sidelink transmission transmitted over the PSFCH, or generated as NACK when the PSFCH is not received.

For example, when receiving HARQ NACK from the Rx UE, the Tx UE may generate HARQ NACK feedback information. As another example, when receiving HARQ ACK from the Rx UE, the Tx UE may generate HARQ ACK feedback information. Further, when a PSFCH is not received from the Rx UE, the Tx UE may generate HARQ NACK feedback information.

Referring back to FIG. 14, the Tx UE may transmit the HARQ feedback information to the base station over the PUCCH based on the resource allocation information, at step S1420.

The Tx UE may transmit, to the base station, information on success or failure of sidelink transmission, or information related to a sidelink retransmission indication according to this, over a PUCCH resource assigned through a PUCCH resource indicator of the sidelink assignment DCI format previously received. That is, the Tx UE may transmit, in the form of HARQ ACK/NACK, to the base station, sidelink retransmission indication information derived based on HARQ ACK/NACK feedback information received from the corresponding Rx UE, over a PUCCH resource assigned through one or more PUCCH resource indicator information region(s) of the sidelink assignment DCI format described above.

In one embodiment, the base station may further include transmission timing indication information on sidelink retransmission indication in the sidelink assignment DCI format. As shown in FIG. 16, at least one HARQ feedback timing indicator information region may be included in the sidelink assignment DCI format. The Tx UE may transmit information on a sidelink retransmission indication using a PUCCH resource assigned by a base station, based on the corresponding timing information.

In one embodiment, timing indication information, a k3 value, for transmitting a PUCCH indicated by the HARQ feedback timing indicator information region may be set based on a slot at which a plurality of PSFCH reception occasions configured for a PSFCH is terminated. That is, the k3 value may include information on a number of slots related to timing at which the Tx UE transmits sidelink retransmission information over a PUCCH, based on a sidelink slot over which the Tx UE receives HARQ ACK/NACK feedback information from a Rx UE over a PSFCH.

The base station may assign a radio resource for sidelink retransmission, when the sidelink retransmission is needed based on the HARQ feedback information received over the corresponding PUCCH. The base station may transmit information on the assigned radio resource to the Tx UE.

According to this, it is possible to provide methods and apparatuses for transmitting and receiving sidelink feedback information for assigning a radio resource for transmitting HARQ feedback information for sidelink transmission to a base station, in the NR.

Figure 15:
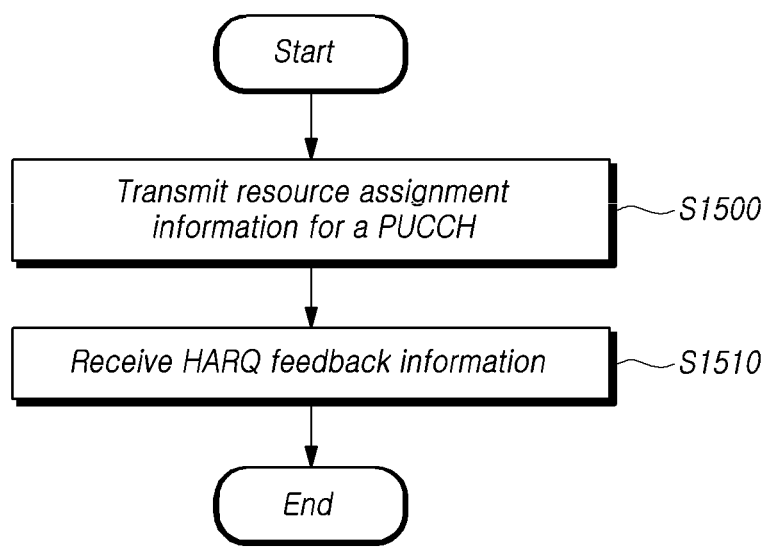
FIG. 15 is a flow diagram illustrating a procedure of a base station for receiving HARQ feedback information for sidelink transmission from a Tx UETx UE in accordance with embodiments of the present disclosure.

FIG. 15 is a flow diagram illustrating a procedure of a base station for receiving HARQ feedback information for sidelink transmission from a Tx UE in accordance with embodiments of the present disclosure.

Referring to FIG. 15, a base station may transmit, to a Tx UE, assignment information on a PUCCH resource for transmitting, to the base station, HARQ feedback information for sidelink transmission to a Rx UE, at step S1500.

In the case of mode 1 in which the base station performs scheduling for sidelink transmission, the base station may transmit resource allocation information on a PSSCH through a sidelink assignment DCI format to the Tx UE. When the Tx UE transmits the PSSCH, or the like through a sidelink according to the corresponding resource allocation information, the Rx UE may transmit HARQ ACK/NACK feedback information corresponding to the received PSSCH over a PSFCH to the Tx UE. According to this, the Tx UE may transmit the HARQ ACK/NACK feedback information for a PSSCH retransmission indication over the PUCCH to the base station according to the received HARQ ACK/NACK feedback information received from the Rx UE.

Accordingly, in one embodiment, the base station may include a PUCCH resource indicator information region for sidelink retransmission indication of the corresponding Tx UE in the sidelink assignment DCI format. That is, as shown in FIG. 16, one or more PUCCH resource indicator information regions may be further included in the sidelink assignment DCI format, as resource allocation information on a PUCCH for the sidelink retransmission indication along with scheduling information on a PSSCH.

Referring back to FIG. 15, the base station may receive, over the PUCCH, HARQ feedback information generated by the Tx UE based on a PSFCH transmitted from the Rx UE, at step S1510.

The Tx UE may perform a PSSCH transmission over a sidelink radio resource assigned by the base station based on the sidelink assignment DCI format. Thereafter, the Tx UE may explicitly or implicitly receive HARQ ACK/NACK feedback information over the PSFCH from the Rx UE.

The base station may receive, in the form of HARQ ACK/NACK, information on whether retransmission is needed for the corresponding PSSCH from the Tx UE over the assigned PUCCH resource, based on the HARQ ACK/NACK feedback information of the Rx UE for the PSSCH transmission. In this case, the HARQ feedback information received in the base station may be generated to have a value equal to HARQ feedback information for the sidelink transmission transmitted over the PSFCH, or generated as NACK when the PSFCH is not received.

For example, when receiving HARQ NACK from the Rx UE, the Tx UE may generate HARQ NACK feedback information. As another example, when receiving HARQ ACK from the Rx UE, the Tx UE may generate HARQ ACK feedback information. Further, when a PSFCH is not received from the Rx UE, the Tx UE may generate HARQ NACK feedback information.

The base station may receive, from the Tx UE, information on success or failure of sidelink transmission, or information related to a sidelink retransmission indication according to this, over a PUCCH resource assigned through a PUCCH resource indicator of the sidelink assignment DCI format. That is, the base station may receive, in the form of HARQ ACK/NACK, from the Tx UE, sidelink retransmission indication information derived based on HARQ ACK/NACK feedback information received from the corresponding Rx UE, over a PUCCH resource assigned through one or more PUCCH resource indicator information region(s) of the sidelink assignment DCI format described above.

In one embodiment, the base station may further include transmission timing indication information on sidelink retransmission indication in the sidelink assignment DCI format. As shown in FIG. 16, at least one HARQ feedback timing indicator information region may be included in the sidelink assignment DCI format. The Tx UE may transmit information on a sidelink retransmission indication using a PUCCH resource assigned by a base station, based on the corresponding timing information.

In one embodiment, timing indication information, a k3 value, for transmitting a PUCCH indicated by the HARQ feedback timing indicator information region may be set based on a slot at which a plurality of PSFCH reception occasions configured for a PSFCH is terminated. That is, the k3 value may include information on a number of slots related to timing at which the Tx UE transmits sidelink retransmission information over a PUCCH, based on a sidelink slot over which the Tx UE receives HARQ ACK/NACK feedback information from a Rx UE over a PSFCH.

The base station may assign a radio resource for sidelink retransmission, when the sidelink retransmission is needed based on the HARQ feedback information received over the corresponding PUCCH. The base station may transmit information on the assigned radio resource to the Tx UE.

Thus, it is possible to provide methods and apparatuses for transmitting and receiving sidelink feedback information for assigning a radio resource for transmitting HARQ feedback information for sidelink transmission to a base station, in the NR.

Hereinafter, embodiments related to radio resource configuration and assignment for transmitting HARQ feedback information for sidelink transmission in the NR will be described with reference to related drawings.

Radio resource assignment for V2X data transmission and reception through LTE-based sidelink may be performed in a distributed manner or in a centralized manner. That is, in one or more resource pools configured by a base station or pre-configured, a Tx UE (a transmitting node) may select a radio resource, for example, a sub-channel, for sidelink data transmission, and transmit a PSSCH and a PSCCH including scheduling control information on the PSSCH over the selected radio resource. Alternatively, a base station may transmit sidelink resource allocation information for a Tx UE to the Tx UE over a PDCCH, and the Tx UE may transmit the corresponding PSCCH and PSSCH using the sidelink resource assigned by the base station. Like this, transmission mode 3 scheduled by a base station or distributed-based transmission mode 4 is defined as a method of transmitting radio data based on the sidelink.

Likewise, mode 1 in which scheduling for a sidelink transmission resource is assigned by a base station (gNB) and mode 2 in which is assigned by a scheduling UE are defined for NR-based V2X.

According to sidelink transmission and reception methods for providing the V2X service in the LTE system, data transmission through sidelink communication has been performed based on the broadcast. That is, sidelink communication is performed in such a manner that when a Tx UE broadcasts a sidelink radio channel or radio signal for transmitting to neighboring UEs without specifying a destination UE, neighboring UEs available to receive the corresponding broadcasting signal receive the corresponding signal. In such a manner, a HARQ procedure for the PSSCH that is a sidelink data channel has not been applied to the LTE V2X.

However, in case of the NR-based V2X, there has arisen a necessity of supporting sidelink transmission/reception based on the unicast or the groupcast, as well as the broadcast.

Like this, when it is desirable to define a sidelink transmission/reception methods based on the unicast or the groupcast as one type of NR-based V2X communication, it is necessary to define a method of applying HARQ for a corresponding sidelink radio channel.

When PSSCH transmission based on the unicast or groupcast is performed, a Rx UE that has received the corresponding PSSCH may feed back HARQ ACK/NACK feedback information in response to the PSSCH reception to a corresponding Tx UE. Herein, a sidelink radio channel for the corresponding HARQ ACK/NACK feedback may be referred to as a PSFCH. It should be noted that this defining is merely one example; therefore, embodiments of the present disclosure are not limited thereto. Other terms may be substantially equally used without departing from the spirit and the scope of the present disclosure.

In one embodiment, a PSFCH resource pool may be configured for HARQ ACK/NACK feedback in response to the PSSCH reception of a Rx UE. The corresponding resource pool configuration information may be configured with time-domain resource allocation information and frequency resource allocation information, and the corresponding resource pool configuration information may be configured through cell-specific or UE-specific higher layer signaling by a base station, or pre-configured. Alternatively, the corresponding resource pool configuration information may be configured by a Tx UE, and then transmitted to a Rx UE over a sidelink radio channel, such as a PSDCH, a PSCCH, a PSSCH, or the like.

A PSFCH resource pool may be configured to be associated with a PSSCH resource pool configuration. Alternatively, a PSFCH resource pool may be configured to be associated with a PSCCH resource pool configuration.

PSFCH resource assignment for allowing a Rx UE to perform HARQ ACK/NACK feedback in response to a PSSCH reception may be performed based on the configured PSFCH resource pool. At this time, PSFCH resource allocation information in the PSFCH resource pool may be explicitly signaled or implicitly signaled.

A PSFCH resource set may be configured for allowing the UE to perform HARQ ACK/NACK feedback in response to the PSSCH reception. The corresponding PSFCH resource set may be configured by a base station and then transmitted through cell-specific or UE-specific higher layer signaling, or be configured by a Tx UE and transmitted over a sidelink radio channel, such as a PSDCH, a PSCCH, a PSSCH, or the like.

PSFCH resource assignment for allowing the Rx UE to perform HARQ ACK/NACK feedback in response to the PSSCH reception may be performed based on the configured PSFCH resource set. At this time, PSFCH resource allocation information in the PSFCH resource pool may be explicitly signaled or implicitly signaled.

When the PSFCH resource allocation information is explicitly signaled, the corresponding PSFCH resource used for HARQ ACK/NACK feedback for the PSSCH reception may be transmitted by a base station or a Tx UE over a PDCCH or a PSCCH by being included in DCI or sidelink control information (SCI). When the PSFCH resource allocation information is implicitly signaled, the corresponding PSFCH resource may be assigned as a function of a resource pool over which PSSCH or PSCCH transmission has been performed, a resource index over which the corresponding PSSCH or PSCCH transmission has been performed in the corresponding resource pool, or the like. For example, the resource index may include a sub-channel index, a sidelink control channel element index, or the like, or the resource index may include a basic unit for PSCCH or PSSCH transmission.

When the PSSCH transmission is performed based on the groupcast, since a plurality of Rx UEs shares one PSFCH explicitly or implicitly signaled, there is a possibility of a collision of PSFCH transmission resources for HARQ ACK/NACK feedback between the plurality of Rx UEs. In order to prevent such a collision, in one embodiment, UE-specific offset may be applicable in assigning a PSFCH resource. According to that, when a PSFCH resource for HARQ ACK/NACK feedback in response to a PSSCH reception is assigned to a UE, each UE may apply its UE-specific offset value to PSFCH resource information explicitly or implicitly signaled by a base station or a Tx UE, and based on this, may derive a final PSFCH resource for HARQ ACK/NACK feedback.

For example, when PSFCH resource allocation information for a UE is indicated through an ACK resource indicator (ARI) information region included in DCI or SCI for transmitting scheduling information for a PSSCH, each UE may derive final PSFCH resource information by adding a UE-specific PSFCH offset value set for each UE to PSFCH resource information indicated by the ARI. Likewise, when PSFCH resource information is implicitly derived, a UE-specific PSFCH offset value may be included as one parameter of a corresponding implicit PSFCH resource deriving function.

In one embodiment, the UE-specific PSFCH offset value may be set by a base station for each UE through UE-specific higher layer signaling, MAC CE signaling, L1 control signaling, or the like. In another embodiment, when a groupcast session is established, the UE specific PSFCH offset value may be set by a base station or a sidelink Tx UE and then, transmitted to each UE. In further another embodiment, when groupcast-based PSSCH resource assignment is performed, the UE-specific PSFCH offset value may be transmitted to each UE over a PDCCH or a PSCCH.

In yet another embodiment, the UE-specific PSFCH offset value may implicitly set as a function of each UE ID, or the like. For example, the UE-specific PSFCH offset value may be derived as a function of a C-RNTI of a UE. In another embodiment, a UE ID for sidelink transmission and/or reception is defined, and according to this, a corresponding UE specific PSFCH offset value may be derived. In this case, the UE ID for corresponding sidelink transmission/reception may be a UE ID of a higher layer, or may be in the form of a destination ID or a source ID as a target of corresponding unicast or groupcast data transmission. Alternatively, the UE ID for corresponding sidelink transmission/reception may be a sidelink physical layer ID for PSCCH reception, such as a SL-RNTI, or the like.

The UE ID for corresponding sidelink transmission and/or reception may be configured by a base station and then assigned through UE-specific higher layer signaling, or the UE ID for corresponding sidelink transmission and/or reception be configured by a sidelink Tx UE or a sidelink scheduling UE and then transmitted over a sidelink radio channel, such as a PSDCH, a PSCCH, a PSSSCH, or the like. UE-specific PSFCH offset information for each sidelink Rx UE may be transmitted to a groupcast PSSCH Tx UE. Specifically, the UE specific PSFCH offset information for each Rx UE may be transmitted by a base station to a groupcast PSSCH Tx UE through higher layer signaling, MAC CE signaling or L1 control signaling, or transmitted by a scheduler UE to a corresponding groupcast PSSCH Tx UE over a sidelink radio channel.

Further, whether configured UE-specific PSFCH offset is introduced may be additionally indicated in assigning a PSFCH resource for HARQ ACK/NACK feedback in response to a PSSCH reception. That is, in allowing a PSSCH Rx UE to derive a PSFCH resource for the HARQ ACK/NACK feedback in response to the corresponding PSSCH reception, a base station, a sidelink Tx UE, or a sidelink scheduler UE may indicate whether to apply a configured UE-specific PSFCH offset value.

Whether the corresponding UE-specific PSFCH offset is applied may be indicated over a PDCCH or a PSCCH by being included in DCI or SCI for transmitting any PSSCH resource allocation information. Specifically, as an information region for indicating whether the corresponding UE-specific PSFCH offset is applied in a DCI format or a SCI format including resource allocation information on the PSSCH, for example, a 1-bit indicator may be defined, and whether the corresponding UE-specific PSFCH offset is applied may be explicitly indicated using the defined indicator.

In another embodiment, without defining a separate indicating information region, when transmitting a DCI format or a SCI format including corresponding PSSCH assignment information, whether the UE-specific PSFCH offset is applied may be implicitly indicated as a function of an RNTI scrambled in CRC, a search space/CORESET over which the DCI format or the SCI format is transmitted, a PSCCH resource pool, or the like.

In further another embodiment, whether the UE-specific PSFCH offset is applied may be semi-statically configured for a UE through higher layer signaling. In yet another embodiment, application of the corresponding UE-specific PSFCH offset may be signaled as activation or deactivation through MAC CE signaling.

In accordance with embodiments of the present disclosure, specific methods are proposed for applying the HARQ in data transmission/reception through the sidelink. In particular, in a situation where sidelink scheduling is applied based on mode 1 in which PSSCH transmission resource assignment of a Tx UE is performed by a base station, a method of a Tx UE is provided for indicating, to a base station, whether retransmission for a PSSCH is needed based on HARQ ACK/NACK information explicitly or implicitly received from a Rx UE in response to the corresponding PSSCH transmission.

Specifically, a method is provided for assigning a PUCCH resource for a situation where the Tx UE transmits corresponding sidelink retransmission indication information over a PUCCH using an UL control information (UCI) format in the form of HARQ ACK/NACK or in the form of scheduling request (SR). It should be noted that the sidelink retransmission indication information is just a term used for discussing embodiments of the present disclosure; therefore, the embodiments of the present disclosure are not limited thereto. Various terms, such as sidelink HARQ ACK/NACK sidelink HARQ ACK/NACK indication information, PSSCH ACK/NACK indication information, or the like may be used without departing from the spirit and the scope of the present disclosure.

Embodiment 1 A method of assigning a PUCCH resource for HARQ ACK/NACK based indication As a method for allowing a transmitter user equipment (Tx UE) to indicate, to a base station, information on success or failure of sidelink PSSCH transmission of the corresponding UE or information on a sidelink retransmission indication according to this, a HARQ ACK/NACK based indication method through a PUCCH may be applied, and a PUCCH resource assignment method to do this may be defined.

In one embodiment to do this, when mode 1 based sidelink scheduling is applied, a PUCCH resource indicator information region for a sidelink retransmission indication of the corresponding Tx UE may be included in a sidelink assignment DCI format for enabling a base station to transmit resource allocation information on a PSSCH to a Tx UE. The Tx UE may transmit, to the base station, information on success or failure of PSSCH transmission or information related to a sidelink retransmission indication according to this, over a PUCCH resource assigned through a PUCCH resource indicator of the sidelink assignment DCI format. That is, the Tx UE may transmit, in the form of HARQ ACK/NACK, information on whether retransmission is needed for the corresponding PSSCH to the base station over the indicated PUCCH resource, based on the HARQ ACK/NACK feedback information of the Rx UE for the PSSCH transmission. In this case, the corresponding PUCCH resource may be assigned through the sidelink assignment DCI format for PSSCH resource assignment, which is transmitted from the base station.

Specifically, when the base station transmits the sidelink assignment DCI format including sidelink transmission resource allocation information for PSSCH transmission of a Tx UE, the corresponding DCI format may include a PUCCH resource indicator information region for indicating PUCCH resource allocation information for receiving feedback on corresponding sidelink retransmission indication information from the Tx UE. Thus, after the Tx UE has transmitted a PSSCH over a sidelink radio resource assigned from the base station based on the corresponding sidelink assignment DCI format, the Tx UE explicitly or implicitly receives feedback on HARQ ACK/NACK information over a PSFCH from a Rx UE. Further, the Tx UE may transmit, in the form of HARQ ACK/NACK, to the base station, the corresponding HARQ ACK/NACK feedback information received from the corresponding Rx UE or sidelink retransmission indication information derived based on this, over a PUCCH resource assigned through one or more PUCCH resource indicator information region(s) of the sidelink assignment DCI format described above.

At this time, in one embodiment, in a situation where a sidelink retransmission necessity indication, that is, HARQ NACK has received from the Rx UE, an indication to the base station may be performed in the form of HARQ NACK. In a situation where a sidelink retransmission unnecessity indication, that is, HARQ ACK has received from the Rx UE, an indication to the base station may be performed in the form of HARQ ACK. In another embodiment, in a situation where a sidelink retransmission necessity indication, that is, HARQ NACK has received from the Rx UE, an indication to the base station may be performed in the form of HARQ NACK. In a situation where a sidelink retransmission unnecessity indication, that is, HARQ ACK has received from the Rx UE, no signal may be transmitted (i.e. DTx).

Hereinafter, provided is a method of configuring a candidate PUCCH resource that can be assigned through a corresponding PUCCH resource indicator, that is, a method of configuring a PUCCH resource set for sidelink feedback. As a first method to do this, a PUCCH resource set configured by a base station for an Uu link of a corresponding Tx UE, that is, a cellular link, may be reused. That is, the Tx UE may reuse the PUCCH resource set configured for the cellular link as a usage for determining a PUCCH resource assigned through a PUCCH resource indicator of a sidelink assignment DCI format in order to indicate success or failure of PSSCH transmission to a base station as described above. That is, the Tx UE may interpret the PUCCH resource indicator of the sidelink assignment DCI format based on the PUCCH resource set of an activated UL BWP, and based on this, derive a PUCCH resource for a sidelink retransmission indication.

As another method, a separate PUCCH resource set may be assigned for only a corresponding PSSCH retransmission indication. At this time, the PUCCH resource set for the corresponding sidelink retransmission indication may be also configured for each UL BWP configured for a corresponding Tx UE in a similar manner to a PUCCH resource set configuration for the Uu link. Alternatively, it may be configured based on a sidelink BWP configured for a corresponding UE. Specifically, regardless of whether a PUCCH resource set of the Uu link is configured for any Tx UE, a base station may configure a separate PUCCH resource set for a PSSCH retransmission indication, and the base station may transmit the configured PUCCH resource set to the corresponding Tx UE through cell-specific or UE-specific higher layer signaling, or a separate pre-configured PUCCH resource set may be defined. Thus, in order to determine a PUCCH resource indicated through a PUCCH resource indicator of the sidelink assignment DCI format, the corresponding Tx UE may apply the PUCCH resource set for the corresponding separate retransmission indication or the PUCCH resource set for the pre-configured sidelink retransmission indication. In this case, when a separate PUCCH resource set is not configured for a PSSCH retransmission indication in a Tx UE, the corresponding UE may reuse a Uu link PUCCH resource set.

As another method, an associated PUCCH resource set in accordance with the configuration of a PSSCH resource pool or a PSCCH resource pool may be configured. In this case, the PUCCH resource indication may also be implicitly signaled in addition to an explicit signaling scheme through the PUCCH resource indicator of the sidelink assignment DCI format. For example, it may be implicitly determined as a function of a different information region of the sidelink assignment DCI format, such as a function of a PSSCH sub-channel ID, or the like in an assigned PSSCH resource pool.

Hereinafter, a method is provided for indicating a transmission time for a sidelink retransmission indication. In one embodiment, a base station may include corresponding sidelink retransmission indication timing configuration information (herein, referred to as "k3 value") in the sidelink assignment DCI format, and then transmit the included information. At this time, the sidelink retransmission indication timing configuration information, the k3 value, may be defined as timing gap information between a slot over which the corresponding sidelink assignment DCI format is transmitted and a slot over which a Tx UE transmits sidelink retransmission indication information over a PUCCH. In another embodiment, the sidelink retransmission indication timing configuration information, the k3 value, may be defined as timing gap information between a sidelink slot over which a Tx UE transmits a PSCCH or a PSSCH to a Rx UE using the sidelink assignment DCI format and a slot over which the Tx UE transmits sidelink retransmission indication information over a PUCCH. In further another embodiment, the sidelink retransmission indication timing configuration information, the k3 value, may be defined as timing gap information between a sidelink slot over which a Tx UE receives HARQ ACK/NACK feedback information from a Rx UE over a PSFCH and a slot over which the Tx UE transmits sidelink retransmission indication information over a PUCCH.

In yet another embodiment, the k3 value, may be configured through higher layer signaling, pre-configured, or fixed as a predetermined value. In yet another embodiment, in any of the above embodiments, in case an associated PUCCH resource set is configured while configuring a PSSCH resource pool, corresponding configuration information may include the k3 value. At this time, the sidelink retransmission indication timing configuration information, the k3 value, may be defined as timing gap information between a slot over which the corresponding sidelink assignment DCI format is transmitted and a slot over which a Tx UE transmits sidelink retransmission indication information over a PUCCH. In another embodiment, the sidelink retransmission indication timing configuration information, the k3 value, may be defined as timing gap information between a sidelink slot over which a Tx UE transmits a PSCCH or a PSSCH to a Rx UE using the sidelink assignment DCI format and a slot over which the Tx UE transmits sidelink retransmission indication information over a PUCCH. In further another embodiment, the sidelink retransmission indication timing configuration information, the k3 value, may be defined as timing gap information between a sidelink slot over which a Tx UE receives HARQ ACK/NACK feedback information from a Rx UE over a PSFCH and a slot over which the Tx UE transmits sidelink retransmission indication information over a PUCCH.

Embodiment 2 A method of assigning a PUCCH resource for an SR-based indication

As a method for allowing a Tx UE to provide, to a base station, information on success or failure of sidelink PSSCH transmission of the corresponding UE or information on a sidelink retransmission indication according to this, a scheduling request (SR) based indication method through a PUCCH may be applied, and a PUCCH resource assignment method to do this may be defined.

All or some embodiments or examples provided with respect to the Embodiment 1 described above may be equally applied to a method of assigning a PUCCH resource for the SR-based sidelink retransmission indication. At this time, when the Tx UE performs SR transmission over the PUCCH resource, in case the Tx UE receives HARQ ACK from a Rx UE for PSSCH transmission, that is, the PSSCH transmission is successful, a negative SR (i.e. no SR is transmitted) may be indicated to a base station, and in case the Tx UE receives HARQ NACK from the Rx UE for the PSSCH transmission, that is, the PSSCH transmission is unsuccessful, a positive SR (i.e. a SR is transmitted) may be indicated to a base station.

As a method of assigning a SR PUCCH resource for the SR-based sidelink retransmission indication, a base station may transmit the SR PUCCH resource for a sidelink retransmission indication to each Tx UE through cell-specific or UE-specific higher layer signaling, apart from a SR PUCCH resource configuration for a cellular link of the corresponding Tx UE. At this time, SR PUCCH resource configuration information for the sidelink retransmission indication may include PUCCH format assignment information, frequency resource allocation information, and time resource allocation information. Specifically, the PUCCH format assignment information and the frequency resource allocation information may be an identical form to typical cellular SR PUCCH configuration information.

In this case, time-domain resource allocation information may be configured differently. For example, the time-domain resource allocation information may be the k3 value of the Embodiment 1 described above different from typical period configuration information. That is, the k3 value may be defined i) as a timing gap value between a sidelink assignment DCI format transmission slot of a base station and a sidelink retransmission indication transmission slot of a Tx UE, ii) as a timing gap value between a PSCCH or PSSCH transmission slot and a sidelink retransmission indication transmission slot, or iii) as a timing gap value between a sidelink slot over which HARQ ACK/NACK feedback information is received from a Rx UE over a PSFCH and a sidelink retransmission indication transmission slot of a Tx UE, and the k3 value may be included in SR PUCCH resource configuration information for sidelink retransmission indication.

In another embodiment, SR PUCCH resource configuration information for a sidelink retransmission indication may be transmitted with only PUCCH format assignment information and frequency resource allocation information through cell-specific or UE-specific higher layer signaling, and the k3 value may be dynamically signaled through a sidelink assignment DCI format.

In further another embodiment, for the SR PUCCH resource, when a PSSCH resource pool is configured, an associated SR PUCCH resource or an associated SR PUCCH resource set may be configured by a base station and transmitted through cell-specific or UE-specific higher layer signaling, or may be pre-configured. A method of configuring the associated SR PUCCH resource or the associated SR PUCCH resource set and a method of determining the SR PUCCH resource according to this may be implemented according to the associated PUCCH resource set configuration method described in the Embodiment 1 described above.

Additionally, among methods of applying the Embodiment 1 or the Embodiment 2, in case all or at least a part of resource allocation information for sidelink retransmission indication through the sidelink assignment DCI format is transmitted and in case one or more PSSCH transmission resources are assigned through the sidelink assignment DCI format, respective sidelink retransmission indication information for all of one or more PSSCHs may be separately transmitted, and in this case, PUCCH resource assignment related information indicated through the corresponding sidelink assignment DCI format may be equally applied in deriving a PUCCH resource for sidelink retransmission indication corresponding to each PSSCH transmission.

Further, different sidelink retransmission indication methods may be applied, according to an RRC connection state of a Tx UE. That is, as a sidelink retransmission indication method of a Tx UE, one or more methods including the methods described above or methods not described above can be defined, and different sidelink retransmission indication methods may be applied, according to an RRC connection state of the Tx UE.

Thus, it is possible to provide methods and apparatuses for transmitting and receiving sidelink feedback information for assigning a radio resource for transmitting HARQ feedback information for sidelink transmission to a base station, in the NR.

Hereinafter, configurations of a Rx UE and a Tx UE capable of performing a part or all of the embodiments described with reference to FIGS. 1 to 16 will be discussed with reference to accompanying drawings.

Figure 17:
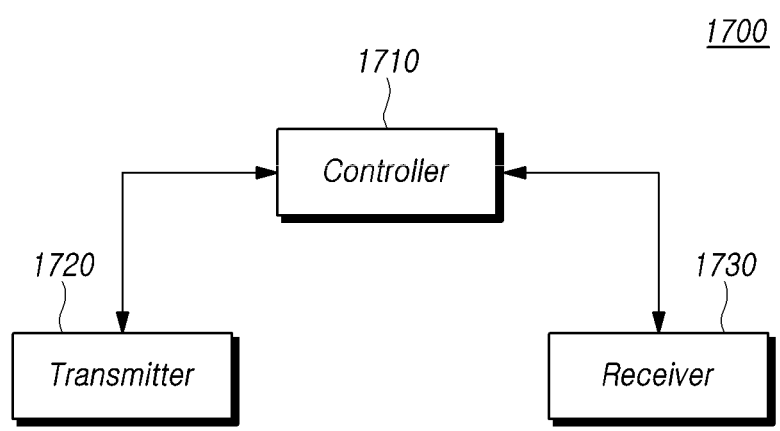
FIG. 17 is a block diagram illustrating a transmitter user equipment in accordance with embodiments of the present disclosure.

FIG. 17 is a block diagram illustrating a Tx UE 1700 in accordance with embodiments of the present disclosure.

Referring to FIG. 17, the Tx UE 1700 includes a controller 1710, a transmitter 1720, and a receiver 1730.

The controller 1710 controls overall operations of the Tx UE 1700 according to methods for allowing the Tx UE to transmit HARQ feedback information for sidelink transmission to a base station, needed to perform the embodiments of the present described above. The transmitter 1720 transmits UL control information, data, and messages etc. to the base station over a corresponding channel, and transmits sidelink control information, data, and messages etc. to a Rx UE over a corresponding channel. The receiver 1730 receives DL control information, data, and messages etc. from the base station over a corresponding channel, and receives sidelink control information, data, and messages etc. from the Rx UE over a corresponding channel.

The receiver 1730 may receive, from the base station, resource allocation information on a PUCCH for transmitting, to the base station, HARQ feedback information for sidelink transmission to the Rx UE. The receiver 1730 may receive resource allocation information on a PSSCH from the base station through a sidelink assignment DCI format. When the transmitter 1720 transmits the PSSCH, or the like through a sidelink according to the corresponding resource allocation information, the Rx UE may transmit HARQ ACK/NACK feedback information corresponding to the received PSSCH over a PSFCH to the Tx UE 1700. Thus, the transmitter 1720 may transmit the HARQ ACK/NACK feedback information for a PSSCH retransmission indication over the PUCCH to the base station according to the received HARQ ACK/NACK feedback information received from the Rx UE.

In one embodiment, the base station may include a PUCCH resource indicator information region for sidelink retransmission indication of the corresponding Tx UE 1700 in the sidelink assignment DCI format. That is, one or more PUCCH resource indicator information regions may be further included in the sidelink assignment DCI format, as resource allocation information on a PUCCH for the sidelink retransmission indication along with scheduling information on a PSSCH.

The controller 1710 may generate HARQ feedback information based on the PSFCH for the sidelink transmission received from the Rx UE. The transmitter 1720 may perform PSSCH transmission over a sidelink radio resource assigned by the base station based on the sidelink assignment DCI format. Thereafter, the receiver 1730 may explicitly or implicitly receive HARQ ACK/NACK feedback information over the PSFCH from the Rx UE.

The transmitter 1720 may transmit, in the form of HARQ ACK/NACK, information on whether retransmission is needed for the corresponding PSSCH to the base station over the assigned PUCCH resource, based on the HARQ ACK/NACK feedback information of the Rx UE for the PSSCH transmission. In this case, the HARQ feedback information transmitted to the base station may be generated to have an equal value or form to HARQ feedback information for the sidelink transmission transmitted over the PSFCH, or generated as NACK when the PSFCH is not received.

For example, when receiving HARQ NACK from the Rx UE, the controller 1710 may generate HARQ NACK feedback information. For another example, when receiving HARQ ACK from the Rx UE, the controller 1710 may generate HARQ ACK feedback information. Further, when a PSFCH is not received from the Rx UE, the controller 1710 may generate HARQ NACK feedback information.

The transmitter 1720 may transmit the HARQ feedback information to the base station over the PUCCH based on the resource allocation information. The transmitter 1720 may transmit, to the base station, information on success or failure of sidelink transmission, or information related to a sidelink retransmission indication according to this, over a PUCCH resource assigned through a PUCCH resource indicator of the sidelink assignment DCI format previously received. That is, the transmitter 1720 may transmit, in the form of HARQ ACK/NACK, to the base station, sidelink retransmission indication information derived based on HARQ ACK/NACK feedback information received from the corresponding Rx UE, over a PUCCH resource assigned through one or more PUCCH resource indicator information region(s) of the sidelink assignment DCI format described above.

In one embodiment, the base station may further include transmission timing indication information on sidelink retransmission indication in the sidelink assignment DCI format. At least one HARQ feedback timing indicator information region may be further included in the sidelink assignment DCI format. The transmitter 1720 may transmit information on sidelink retransmission indication using a PUCCH resource assigned by the base station, based on the corresponding timing information.

In one embodiment, the timing indication information, a k3 value, for transmitting a PUCCH indicated by the HARQ feedback timing indicator information region may be set based on a slot at which a plurality of PSFCH reception occasions configured for a PSFCH is terminated. That is, the k3 value may include information on a number of slots related to timing at which the Tx UE transmits sidelink retransmission information over a PUCCH, based on a sidelink slot over which the Tx UE receives HARQ ACK/NACK feedback information from the Rx UE over a PSFCH.

The base station may assign a radio resource for sidelink retransmission, when the sidelink retransmission is needed based on the HARQ feedback information received over the corresponding PUCCH. The base station may transmit information on the assigned radio resource to the Tx UE.

Thus, it is possible to provide methods and apparatuses for transmitting and receiving sidelink feedback information for assigning a radio resource for transmitting HARQ feedback information for sidelink transmission to a base station, in the NR.

Figure 18:
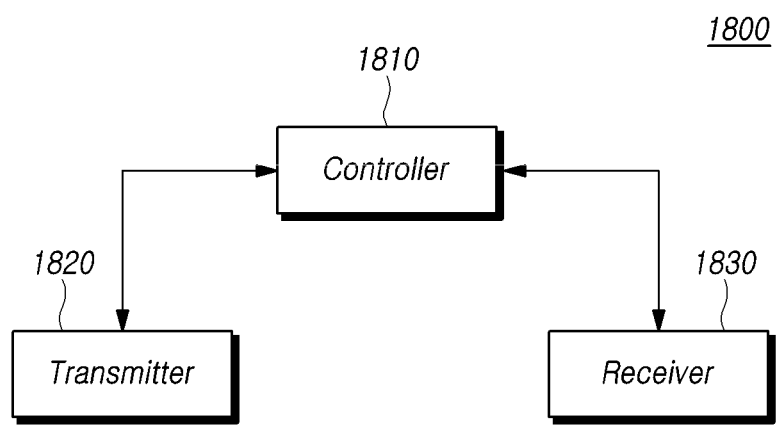
FIG. 18 is a block diagram illustrating a base station in accordance with embodiments of the present disclosure.

FIG. 18 is a block diagram illustrating a base station 1800 in accordance with embodiments of the present disclosure.

Referring to FIG. 18, the base station 1800 includes a controller 1810, a transmitter 1820, and a receiver 1830.

The controller 1810 controls overall operations of the base station 1800 according to methods for allowing the base station 1800 to receive HARQ feedback information for sidelink transmission from a Tx UE, needed to perform the embodiments of the present described above. The transmitter 1820 is used to transmit signals, messages, and data needed for carrying out the embodiments described above to a UE. The receiver 1830 is used to receive signals, messages, and data needed for carrying out the embodiments described above from a UE.

The transmitter 1820 may transmit, to the Tx UE, assignment information on a PUCCH resource for transmitting, to the base station 1800, HARQ feedback information for sidelink transmission to a Rx UE. In the case of mode 1 in which the base station performs scheduling for sidelink transmission, the transmitter 1820 may transmit resource allocation information on a PSSCH through a sidelink assignment DCI format to the Tx UE. When the Tx UE transmits the PSSCH, or the like through a sidelink according to the corresponding resource allocation information, the Rx UE may transmit HARQ ACK/NACK feedback information corresponding to the received PSSCH over a PSFCH to the Tx UE. Thus, the receiver 1830 may receive, from the Tx UE, the HARQ ACK/NACK feedback information for a PSSCH retransmission indication to the base station over the PUCCH according to the received HARQ ACK/NACK feedback information received from the Rx UE.

Accordingly, in one embodiment, the controller 1810 may include a PUCCH resource indicator information region for sidelink retransmission indication of the corresponding Tx UE in the sidelink assignment DCI format. That is, one or more PUCCH resource indicator information regions may be further included in the sidelink assignment DCI format, as resource allocation information on a PUCCH for the sidelink retransmission indication along with scheduling information on a PSSCH.

The receiver 1830 may receive, over the PUCCH, HARQ feedback information generated by the Tx UE based on a PSFCH transmitted from the Rx UE. The Tx UE may perform a PSSCH transmission over a sidelink radio resource assigned by the base station based on the sidelink assignment DCI format. Thereafter, the Tx UE may explicitly or implicitly receive HARQ ACK/NACK feedback information over the PSFCH from the Rx UE.

The receiver 1830 may receive, in the form of HARQ ACK/NACK, information on whether retransmission is needed for the corresponding PSSCH from the Tx UE over the assigned PUCCH resource, based on the HARQ ACK/NACK feedback information of the Rx UE for the PSSCH transmission. In this case, the HARQ feedback information received by the receiver 1830 may be generated to have an equal value or form to HARQ feedback information for the sidelink transmission transmitted over the PSFCH, or generated as NACK when the PSFCH is not received.

For example, when receiving HARQ NACK from the Rx UE, the Tx UE may generate HARQ NACK feedback information. For another example, when receiving HARQ ACK from the Rx UE, the Tx UE may generate HARQ ACK feedback information. Further, when a PSFCH is not received from the Rx UE, the Tx UE may generate HARQ NACK feedback information.

The receiver 1830 may receive, from the Tx UE, information on success or failure of sidelink transmission, or information related to a sidelink retransmission indication according to this, over a PUCCH resource assigned through a PUCCH resource indicator of the sidelink assignment DCI format. That is, the receiver 1830 may receive, in the form of HARQ ACK/NACK, from the Tx UE, sidelink retransmission indication information derived based on HARQ ACK/NACK feedback information received from the corresponding Rx UE, over a PUCCH resource assigned through one or more PUCCH resource indicator information region(s) of the sidelink assignment DCI format described above.

In one embodiment, the controller 1810 may further include transmission timing indication information on sidelink retransmission indication in the sidelink assignment DCI format. In this case, at least one HARQ feedback timing indicator information region may be further included in the sidelink assignment DCI format. The Tx UE may transmit information on sidelink retransmission indication using a PUCCH resource assigned by the base station, based on the corresponding timing information.

In one embodiment, the timing indication information, a k3 value, for transmitting a PUCCH indicated by the HARQ feedback timing indicator information region may be set based on a slot at which a plurality of PSFCH reception occasions configured for a PSFCH is terminated. That is, the k3 value may include information on a number of slots related to timing at which the Tx UE transmits sidelink retransmission information over a PUCCH, based on a sidelink slot over which the Tx UE receives HARQ ACK/NACK feedback information from the Rx UE over a PSFCH.

The controller 1810 may assign a radio resource for sidelink retransmission, when the sidelink retransmission is needed based on the HARQ feedback information received over the corresponding PUCCH. The transmitter 1820 may transmit information on the assigned radio resource to the Tx UE.

Thus, it is possible to provide methods and apparatuses for transmitting and receiving sidelink feedback information for assigning a radio resource for transmitting HARQ feedback information for sidelink transmission to a base station, in the NR.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method for transmitting, to a base station, hybrid automatic repeat request (HARQ) feedback information related to a sidelink communication between a first device and at least one second device, the method comprising:

receiving, by the first device and from the base station, downlink control information (DCI), the DCI including resource allocation information about a physical uplink control channel (PUCCH) for transmitting second HARQ feedback information related to the sidelink communication to the base station, the resource allocation information including timing information about a timing gap based on a slot at which a plurality of physical sidelink feedback channel (PSFCH) reception occasions are ended;

generating, by the first device, the second HARQ feedback information; and transmitting, by the first device and to the base station, the second HARQ feedback information over the PUCCH based on the timing information, wherein the at least one second device includes a plurality of second devices, wherein the PSFCH is a PSFCH shared by the plurality of second devices, and wherein the first device transmits sidelink retransmission information over the PUCCH based on a number of slots over which the first device respectively receives HARQ feedback information from each of the plurality of second devices over the shared PSFCH.

2. The method according to claim 1,
wherein the timing gap is a gap between a first slot and a second slot,
wherein the first slot is a slot used for transmitting a corresponding sidelink assignment DCI format, and
wherein the second slot is a slot used for transmitting the second HARQ feedback information via the PUCCH to the base station.

3. The method according to claim 1,
wherein the timing gap is a gap between a first slot and a second slot,
wherein the first slot is a sidelink slot used for transmitting a physical sidelink channel to the at least one second device using a corresponding sidelink assignment DCI format, and
wherein the second slot is a slot used for transmitting the second HARQ feedback information via the PUCCH to the base station.

4. The method according to claim 1,
wherein the timing gap is a gap between a first slot and a second slot,
wherein the first slot is a sidelink slot used for receiving, via the PSFCH, first HARQ feedback information from the at least one second device, and
wherein the second slot is a slot used for transmitting the second HARQ feedback information via the PUCCH to the base station.

5. The method according to claim 4, further comprising:
receiving, by the first device and from the at least one second device, the first HARQ feedback information via the PSFCH,
wherein the second HARQ feedback information has an equal value to the first HARQ feedback information.

6. The method according to claim 1, wherein the timing information is preconfigured through a higher layer signaling.

7. The method according to claim 1, wherein the second HARQ feedback information includes a NACK when the PSFCH is not received.

8. The method according to claim 1, wherein each of the first device and the at least one second device derives final PSFCH resource information by adding a UE-specific offset value to PSFCH resource information.

9. A method of a base station of receiving hybrid automatic repeat request (HARQ) feedback information related to a sidelink communication between a first device and at least one second device, the method comprising:
transmitting, by the base station and to the first device, downlink control information (DCI), the DCI including resource allocation information about a physical uplink control channel (PUCCH) for receiving second HARQ feedback information related to the sidelink communication from the first device, the resource allocation information including timing information about a timing gap based on a slot at which a plurality of physical sidelink feedback channel (PSFCH) reception occasions are ended; and receiving, by the base station, the second HARQ feedback information over the PUCCH based on the timing information, wherein the at least one second device includes a plurality of second devices, wherein the PSFCH is a PSFCH shared by the plurality of second devices, and wherein the first device transmits sidelink retransmission information over the PUCCH based on a number of slots over which the first device respectively receives HARQ feedback information from each of the plurality of second devices over the shared PSFCH.

10. The method according to claim 9,
wherein the timing gap is a gap between a first slot and a second slot,
wherein the first slot is a slot used for transmitting a corresponding sidelink assignment DCI format, and
wherein the second slot is a slot used for transmitting the second HARQ feedback information via the PUCCH to the base station.

11. The method according to claim 9,
wherein the timing gap is a gap between a first slot and a second slot,
wherein the first slot is a sidelink slot used for transmitting a physical sidelink channel to the at least one second device using a corresponding sidelink assignment DCI format, and
wherein the second slot is a slot used for transmitting the second HARQ feedback information via the PUCCH to the base station.

12. The method according to claim 9,
wherein the timing gap is a gap between a first slot and a second slot,
wherein the first slot is a sidelink slot used for receiving, via the PSFCH, first HARQ feedback information from the at least one second device, and
wherein the second slot is a slot used for transmitting the second HARQ feedback information via the PUCCH to the base station.

13. The method according to claim 12, wherein the second HARQ feedback information has an equal value to the first HARQ feedback information.

14. The method according to claim 9, wherein the timing information is preconfigured through a higher layer signaling.

15. The method according to claim 9, wherein the second HARQ feedback information includes a NACK when the PSFCH is not received.

16. The method according to claim 9, wherein each of the first device and the at least one second device derives final PSFCH resource information by adding a UE-specific offset value to PSFCH resource information. s over the shared PSFCH.

17. A first device for transmitting hybrid automatic repeat request (HARQ) feedback information related to a sidelink communication between the first device and at least one second device, the first device comprising:
a receiver receiving, from the base station, downlink control information (DCI), the DCI including resource allocation information about a physical uplink control channel (PUCCH) for transmitting second HARQ feedback information related to the sidelink communication to the base station, the resource allocation information including timing information about a timing gap based on a slot at which a plurality of physical sidelink feedback channel (PSFCH) reception occasions are ended;

a controller generating the second HARQ feedback information; and a transmitter transmitting, to the base station, the second HARQ feedback information over the PUCCH based on the timing information, wherein the at least one second device includes a plurality of second devices, wherein the PSFCH is a PSFCH shared by the plurality of second devices, and wherein the first device transmits sidelink retransmission information over the PUCCH based on a number of slots over which the first device respectively receives HARQ feedback information from each of the plurality of second devices over the shared PSFCH.

18. The first device according to claim 17, wherein each of the first device and the at least one second device derives final PSFCH resource information by adding a UE-specific offset value to PSFCH resource information.

* * * * *